Sept. 19, 1933.  J. J. HINES  1,927,314
HOSE COUPLING
Filed May 31, 1932
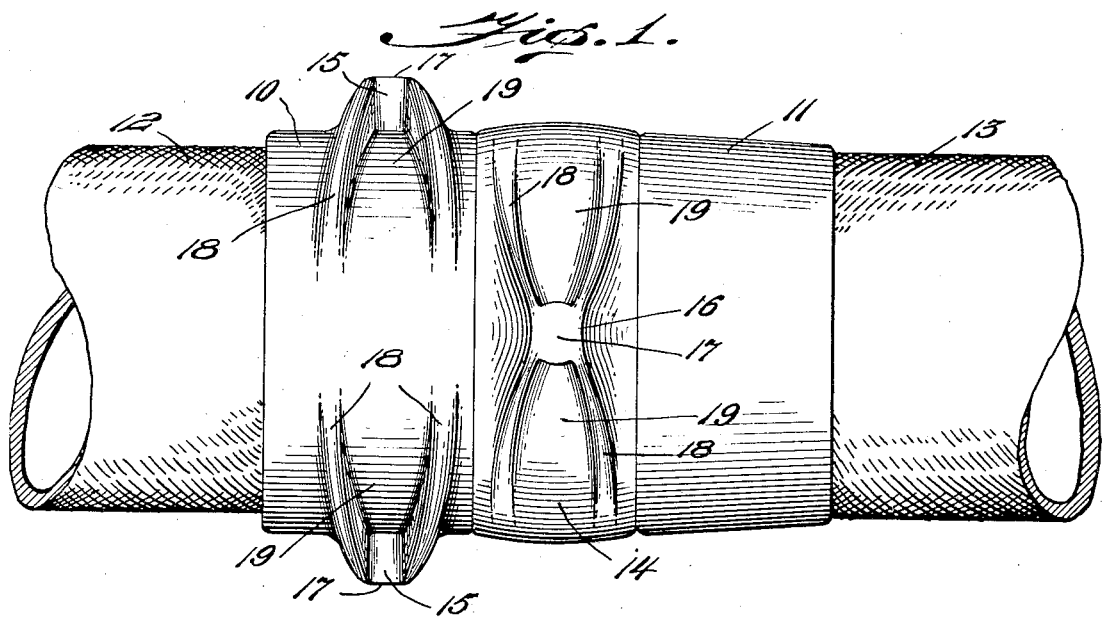
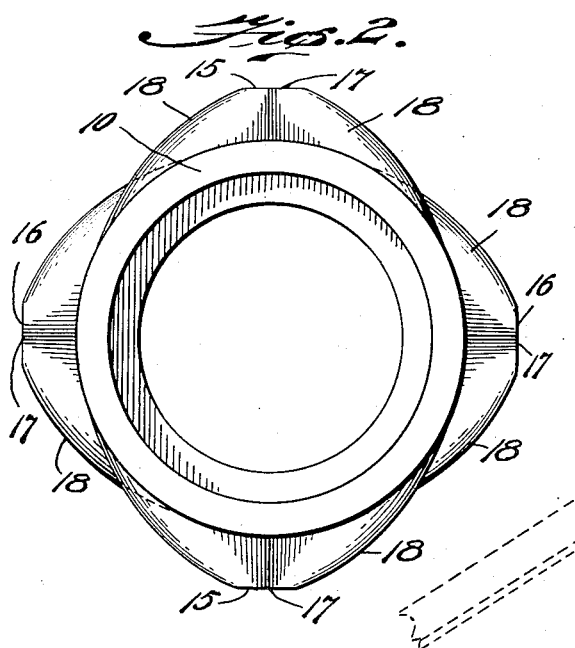
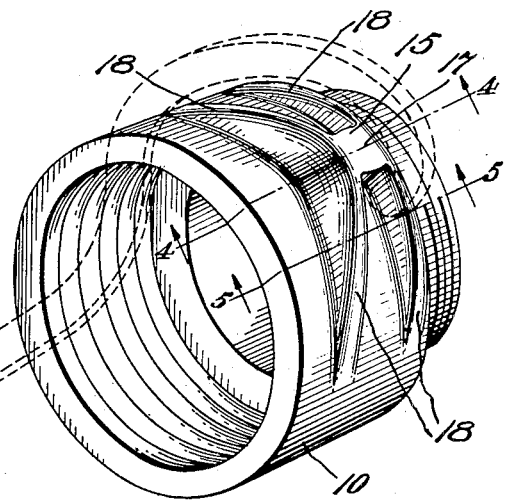
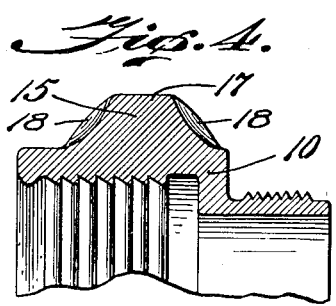
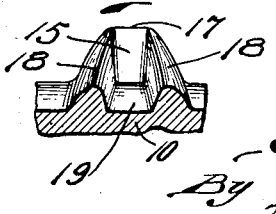
Inventor
John J. Hines
By Horatio E. Bellows
Attorney Patented Sept. 19, 1933

1,927,314

UNITED STATES PATENT OFFICE 1,927,314

HOSE COUPLING

John J. Hines, Pawtucket, R. I.

Application May 31, 1932. Serial No. 614,420

7 Claims. (Cl. 285—120)

My present invention relates to fire fighting apparatus and pertains particularly to improvements in coupling connections for coupling fire hose and the like.

The fire hose couplings commonly employed utilize lugs which are adapted to be gripped by a hose wrench for quickly coupling or uncoupling the hose connections. These lugs are of two general types, the post type which is formed integral with the coupling and extends radially therefrom as a cylindrical projection which is adapted to fit in the recess or socket of a coupling wrench, and the transverse lug type which is formed as a lug of generally extended width provided with a groove or opening for receiving the end of a coupling wrench.

Both types of lugs have the disadvantage that a fireman must use two hands to fit the wrench to the lug, one hand fitting one end of the wrench to the lug while the other hand holds the wrench handle, as the coupling has no structure for guiding or for assisting in setting the end of the wrench into locking engagement with the coupling lug. The principal objects of my invention are to devise a lug construction for hose couplings which will guide the coupling wrench into operative position and thus facilitate proper setting of the wrench, and to furnish a seat to fit the operator's thumbs when the coupling is broken by hand.

Another disadvantage inherent in the present standard types of lug constructions resides in the spacing of the lugs on the coupling parts, due to the shape of the lugs, this spacing permitting insertion or entering of a foreign body between the lugs of the coupling and thus interfering with free movement of the hose coupling when dragged around during a fire fighting operation. It is another object of my invention to provide a lug construction for hose couplings which will not present abrupt spaces for entrance of foreign bodies between adjacent coupling lugs, and will therefore facilitate free movement of the hose coupling parts when dragged over stairs, around corners, and over rough ground and the like during fire fighting operations.

A further disadvantage of the lugs now in use resides in their tendency to break or shear if subjected to a sharp transverse blow. It is, therefore, a further object of my invention to provide a lug construction that has no upstanding surface adapted to receive a breaking or shearing impact.

With the above and other objects and advantageous features in view, the invention comprises a novel arrangement of parts more fully disclosed in the detailed description following, in conjunction with the accompanying drawing, and more particularly defined in the claims appended hereto.

In the drawing,

Figure 1 is an elevation of the novel hose coupling, in assembled position;

Figure 2 is a side view of Figure 1, the hose being removed;

Figure 3 is a perspective view of the end member, the position of the coupling wrench being indicated in dotted lines;

Figure 4 is a section on the line 4—4 of Figure 3, showing the preferred cross section of the lug structure; and Figure 5 is a fragmentary section on the line 5—5 of Figure 3.

The coupling is of the usual construction with respect to the coupling arrangement, the end members 10, 11 having hose connections 12, 13 attached thereto and the swivelled center member 14 having the usual annular shoulder for engaging an annular groove in the end member 11 and the usual threads for engagement with the similarly threaded member 10. In assembling the parts 11 and 14 the reduced end of the member 11 is inserted in the member 14 and is then expanded to form a swivelled connection. The members 10 and 14 have been provided with improved coupling lugs 15 and 16 respectively, these lugs each comprising a center portion 17 and diverging channel sections 18 extending from the center portion to form guide channels 19 for guiding the end of a socket wrench into engagement with the center portion 17. As shown, the channel sections 18 taper down to merge with the surface of the coupling members, and the length of the channel sections is preferably sufficient to permit an overlapping of the channel sections when the members 10 and 14 are in coupled position, as indicated in Figure 2, whereby no open spaces remain between the lug structures, and no foreign body can enter and be caught between the lugs of the assembled hose coupling. If desired the length of the channel sections may be shortened as the tapered channel sides will throw aside any obstructions that might otherwise catch between the lugs.

The sides of the lug structure are preferably hollowed out in the vicinity of the center lug portion, as indicated in Figure 4, and the sides of the channel sections are preferably made as thin as is found practicable, to reduce the amount of metal and the weight of the coupling parts, and are spaced so as to properly accommodate and guide the end of a coupling wrench into engagement with the center portion. The sides of the channels are preferably sloped slightly, so as to prevent retention or wedging of ice, dirt, or other material therein. If desired, the channels may be widened to extend to one or both edges of the coupling members; and the metal between the channels may be cut away to reduce the projection of the coupling lug from the peripheral surface of the coupling members.

The center portion 17 is preferably laterally rounded, as indicated in Figure 1, but may be made flat if desired, as the center portion is essentially an abutment between the guiding channel sections, and may be any shape suitable for engagement by a particular coupling wrench end.

The improved hose coupling construction therefore serves to facilitate engagement of the coupling wrench with the coupling lug, and thus reduces the attention required of the firemen; in addition, the tapering formation of the guiding channels eliminates abrupt gaps or spaces between the lugs of the assembled coupling connection, and thus eliminates possibility of insertion or entering of foreign bodies or elements and consequent interference with free movement of the hose during fire fighting operations. Moreover, the parts of the lug structure eliminate all sharp projections or surfaces, and thus prevent breaking or shearing of the lug when subjected to sharp impacts or blows.

While I have described a preferred constructional embodiment of hose coupling and lug structure, such changes in the arrangement, in the shape, and in the proportions of the parts may be made as appear desirable, within the spirit and the scope of the invention as defined in the appended claims.

I claim:—

1. A hose coupling comprising end members and a collar swivelled to one of said end members, said collar and the other end member having coupling lugs and guide elements integral with and extending from the ends of said coupling lugs for guiding a coupling wrench into operative engagement with said coupling lugs.

2. A hose coupling comprising end members and a collar swivelled to one of said end members, said collar and the other end member having coupling lugs and guide elements integral with and divergently extending from the ends of said coupling lugs and forming channels for guiding a coupling wrench into operative engagement with said coupling lugs.

3. A hose coupling member having a body portion, a coupling lug extending therefrom, and elements on said body portion extending circumferentially from said coupling lug, and tapering gradually to merge with said body portion.

4. A hose coupling member having a body portion, a coupling lug extending therefrom, and guide elements on said body portion extending circumferentially and diverging from said coupling lug, and tapering gradually to merge with said body portion to form guide channels for said coupling lug.

5. A hose coupling member having a body portion, a coupling lug extending therefrom, and brace elements on said body portion integral with said coupling lug and merging with said body portion.

6. A hose coupling member having a body portion, a coupling lug extending therefrom, and brace elements on said body portion integral with said coupling lug and extending circumferentially therefrom and merging with said body portion.

7. A hose coupling member having a generally cylindrical body portion provided with a circumferential guide channel for the reception of the head of a coupling wrench, and an abutment element between the walls of the channel at one end thereof adapted to be engaged by the head of the coupling wrench, the walls of said channel merging with the surface of the body portion at the other end of the channel.

JOHN J. HINES.